United States Patent [19]
Cole

[11] Patent Number: 6,160,763
[45] Date of Patent: Dec. 12, 2000

[54] TOWED ARRAY HYDROPHONE

[75] Inventor: Jerry C. Cole, Pleasant Lake, Mich.

[73] Assignee: SeaLandAire Technologies, Inc., Jackson, Mich.

[21] Appl. No.: 09/221,374

[22] Filed: Dec. 28, 1998

[51] Int. Cl.[7] ...................................................... H04R 7/00
[52] U.S. Cl. ........................... 367/173; 367/160; 367/154
[58] Field of Search ..................... 367/154, 160, 367/165, 166, 171, 173, 188, 15, 24; 310/328, 329, 330, 331, 334, 337

[56] References Cited

U.S. PATENT DOCUMENTS 3,988,620  10/1976  McDavid ................................. 367/160
5,404,340   4/1995  Weichart et al. ....................... 367/166

Primary Examiner—Daniel T. Pihulic
Attorney, Agent, or Firm—Young & Basile, P.C.

[57] ABSTRACT

An omni-directional dual bilaminar hydrophone particularly suitable for use in a towed array consisting of a cylindrical tubular housing whose ends are sealed by bilaminar piezo-electric ceramic/diaphragm subassemblies capable of axially deforming to produce an electric signal proportional to the intensity of the sound vibrations sensed. The density of the air-backed hydrophone may be readily predetermined by the spacing between the ceramic/diaphragm assemblies, and/or diameter of the housing. A plurality of such hydrophones internally connected in series assembled within a cylindrical flexible fluid filled support, such as a hose, may be used as a towed array wherein the separate hydrophones thereof are electrically connected in series parallel, or series-parallel, to produce a signal from sonic vibrations.

8 Claims, 1 Drawing Sheet

TOWED ARRAY HYDROPHONE

BACKGROUND OF THE INVENTION

1. Field of the Invention

The invention pertains to hydrophones utilizing piezoelectric elements to sense sonic vibrations.

2. Description of the Related Art

Towed arrays of hydrophones are commonly used to sense underwater sonic vibrations. Such arrays are commonly used by submarines and vessels to detect the presence of other vessels, and towed arrays may also be used for geophysical purposes such as oil exploration.

Commonly, a towed array consists of a plurality of electrically interconnected hydrophones towed behind a moving vessel, such as a submarine, and the hydrophones of the array are electrically interconnected so as to produce an amplified signal. While towed arrays have been commonly employed to detect sonic vibrations in the past, existing towed arrays are subject to extraneous noise due to movement through the water and are sensitive to acceleration forces which may not be due to sonic vibration. Further, hydrophones of conventional towed arrays are expensive to manufacture, and as many hydrophones must be used in a conventional towed array which may have a length of approximately 5,000 feet, a towed array of conventional construction is very expensive.

OBJECTS OF THE INVENTION

It is an object of the invention to provide an inexpensive hydrophone utilizing two bilaminar assemblies wherein inherent acceleration cancelling in the longitudinal axis of sensitivity is provided resulting in a very low acceleration sensitivity.

Another object of the invention is to provide an inexpensive dual bilaminar hydrophone which is insensitive to acceleration effects in a direction transverse to the axis of sensitivity of the hydrophone.

An additional object of the invention is to provide a dual bilaminar hydrophone of inexpensive construction which is suitable for use in towed arrays having a wide range of sensitivity, capacitance and buoyancy characteristics, and which may be readily produced with a variety of buoyancy characteristics.

Another object of the invention is to provide a dual bilaminar hydrophone which is self-contained, economical, rugged in construction and not susceptible to casual damage.

A further object of the invention is to provide a dual bilaminar hydrophone suitable for use in towed arrays wherein the hydrophone has a very low density because of its use of an air cavity and a lightweight piezoelectric element.

Yet a further object of the invention is to provide an inexpensive hydrophone capable of being utilized at great depths, which is insensitive to changes in hydrostatic pressure yet maintains the designed sensitivity characteristics over the operating depth range of the hydrophone.

An additional object of the invention is to provide a dual bilaminar hydrophone particularly suitable for use with towed arrays wherein the characteristics of the hydrophone permit fewer hydrophones to be used in a towed array for providing output characteristics equivalent to those previously obtained by a towed array having a greater number of hydrophones than those necessary with the invention.

SUMMARY OF THE INVENTION

A hydrophone in accord with the invention consists of a substantially rigid housing machined or molded from nylon or other solid material. The housing is preferably in the form of a cylindrical tube and may be about one and one-half inches long, the ends of the tube being squared with the longitudinal axis. The ends of the tubular housing are each sealed by a bilaminar assembly consisting of a ceramic piezoelectric disc element affixed to a diaphragm preferably made of metal, such as brass or aluminum. The shape of the diaphragm is circular and is of a greater dimension than the diameter of the circular ceramic disc, and the periphery of the diaphragm is sealed to the associated open end of the housing. Preferably, the housing includes an internal annular shoulder against which the diaphragm periphery is supported against axial movement toward the interior of the housing.

The diaphragm is retained within the housing end by an adhesive such as an epoxy, or a retainer ring may be used, or a combination of epoxy and a retainer ring may be employed, and the presence of identical ceramic disc/diaphragm assemblies at each end of the housing seals the interior of the air filled housing. Preferably, an encapsulation potting material is located within the housing opening adjacent the ceramic disc to provide further sealing and damping.

The opposite sides of the piezoelectric ceramic disc constitute plus and negative disc poles, and the contiguous attachment of one side of the ceramic disc to a side of the diaphragm produces a diaphragm polarity of the same value. The ceramic discs in a common housing are positioned such that the diaphragms will be of opposite polarity and an electrical conductor is affixed to the diaphragms extending through the housing interior and electrically interconnecting the opposite diaphragm poles.

The density or buoyancy of the hydrophone is determined by the length and diameter of the housing. In this manner, the buoyancy of the housing can be accurately regulated to determine the desired air volume therein in relation to the weight of the other hydrophone components.

A hydrophone constructed in accord with the inventive concepts is omni-directional and senses sound vibrations travelling from any direction. The axis of the housing constitutes an axis of sensitivity, and sound vibrations imposed upon the ceramic disc/diaphragm assemblies tends to deform the assemblies inwardly toward the interior of the common housing. This deformation of the diaphragms and ceramic discs produce an electric signal proportional to the intensity of the sound vibrations, and the series connection of the ceramic disc/diaphragm assemblies of a common hydrophone amplifies the electric signal produced by the two bilaminar assemblies.

A hydrophone constructed in accord with the above is not sensitive to movement or acceleration noise in a direction substantially parallel to the axis of sensitivity because such longitudinal noise vibrations substantially parallel to the axis of sensitivity produce equal deflections of the ceramic disc/diaphragm assemblies at each end of the housing in a common direction, rather than in opposite directions toward each other, and such deflection of the assemblies produces equal and opposite electrical signals which cancel out each other. Further, transverse motion induced vibrations or acceleration imposed upon the hydrophone tending to move the hydrophone in a direction perpendicular to the axis of sensitivity produces no signal as no deformation of the ceramic disc/diaphragm assemblies occurs.

Accordingly, it will be appreciated that the reverse polarity of the hydrophone ceramic disc/diaphragm assemblies produces an amplified signal when the assemblies are deflected inwardly by a sound field, but produce cancelling signals in a direction of longitudinal motion induced vibration. This characteristic of the hydrophone produces accurate signals proportional to the intensity of the sound vibrations being received and permits an accurate determination of the characteristics of the source of such sound vibrations to be determined.

Preferably, the hydrophone of the invention is employed in a towed array wherein a plurality of identical hydrophones are mounted within an elongated flexible fluid filled support, such as a hose. The hydrophones of a common array are interconnected in series, parallel or series-parallel as to produce an amplified signal and appropriate electrical characteristics, and the support for the hydrophones may include a conductive foam jacket located within a conductive cloth envelope for electrical shielding. A towed array using a plurality of hydrophones, such as twelve series, parallel or series-parallel connected hydrophones, constitute a unit in the total array which may be of a length close to one mile. By comparing the electronic signals received by the hydrophones, electronic analyzing equipment can readily determine the direction and intensity of the sound vibrations for identification and location purposes.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
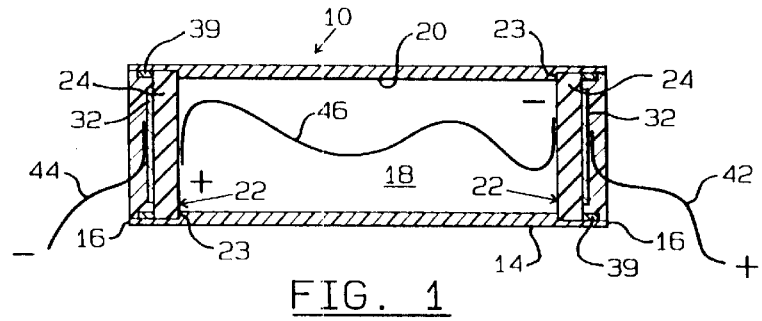
FIG. 1 is an elevational diametrical sectional view of a dual bilaminar hydrophone constructed in accord with the invention.
Figure 2:
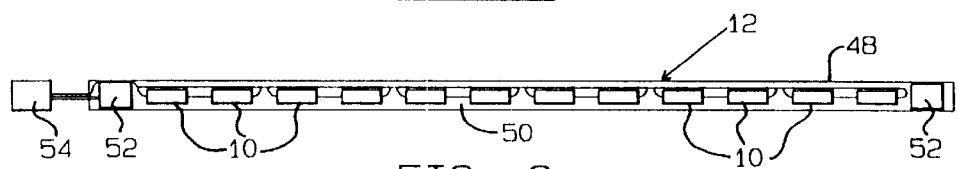
FIG. 2 is an elevational diametrical sectional view of a typical hydrophone array using the hydrophones of the invention.

A dual bilaminar hydrophone constructed in accord with the inventive concepts is shown at 10 in FIG. 1, and an array of hydrophones 10 interconnected and assembled to serve as a unit of a towed array is represented at 12 in FIG. 2.

Figure 4:
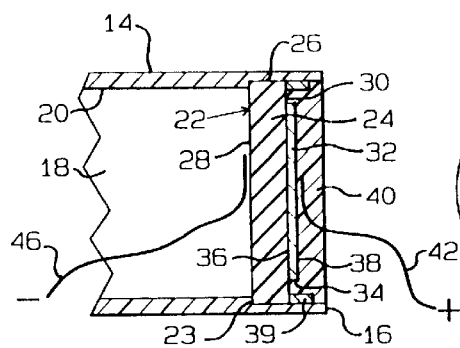
FIG. 4 is an elevational diametrical sectional detail enlarged view of an end of a dual bilaminar hydrophone constructed in accord with the invention.
Figure 5:
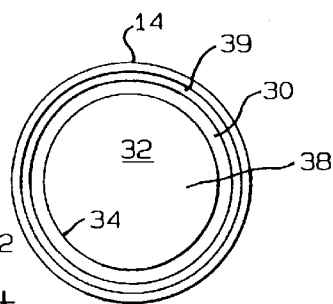
FIG. 5 is an elevational end view of the hydrophone of FIG. 4 as taken from the right end thereof.

With reference to FIGS. 1 and 4, the hydrophone housing 14 is of a cylindrical configuration having open ends 16 and an interior space 18 defined by the housing bore 20. The housing ends 16 are counterbored machined, or molded, to define an annular shoulder 23 adjacent each housing end.

The housing 14 is constructed of a relatively rigid material, and is preferably molded or machined of a synthetic material such as a 33% glass fiber filled 6/6 nylon. Such material is non-corrosive, relatively rigid and suitable for hydrophone use.

Each housing end 16 is sealed by a piezoelectric ceramic/diaphragm assembly 22. The assemblies 22 are identical in construction and each include a circular diaphragm 24 having a circular periphery 26 of a diameter to be closely received within the housing ends 16. The diaphragm inner sides 28 engage the shoulders 23 adjacent the periphery 26 and the diaphragm outer sides 30 serve as the mounting surface for the ceramic discs as later described. Preferably, the diaphragm 24 is formed of a deformable metal, such as brass or aluminum, and in a commercial embodiment of the invention, brass is employed. The material which the diaphragm 24 is constructed must be electrically conducive and of a sufficient axial thickness to withstand high pressures, yet axially flex when subjected to sonic vibrations.

Each of the diaphragms 24 has a piezoelectric disc 32 soldered or bonded to the outer side 34 thereof. The ceramic discs 32 are preferably of a circular configuration and may be formed of any suitable piezoelectric material which produces electrical signals upon deflection of the disc in an axial direction such as Navy Type II. The circular periphery of the discs 32 is shown at 34, and each disc includes an inner side 36 which is soldered or adhered to the associated diaphragm 24 in a firm and electrical conducting manner. The outer side 38 of the ceramic disc 32 extends away from the hydrophone housing interior 18.

In the drawings, the diaphragms 24 are illustrated as being firmly maintained within the housing ends 16 by retaining rings 39, and the use of such rings is desirable from an assembly standpoint as such rings will maintain the diaphragms against the shoulders 23. However, the use of retaining rings 39 is optional, and the diaphragms 24 can be bonded against the shoulders 39 solely by the use of bonding agents or epoxies which secure the diaphragms adjacent the peripheries 26 firmly holding the peripheries 26 against the adjacent annular housing shoulder 23. It will therefore be appreciated that either or both bonding agents or the retainer rings 39 firmly maintain each assembly 22 within a housing end 16 in a mechanically rigid manner which also aids in sealing the housing interior 18 against entry by water.

A potting material 40 is preferably located within the housing ends 16 adjacent the outer surfaces of the assemblies 22 engaging the diaphragm outer sides 30 and the ceramic discs' outer sides 38. The potting material is preferably of a synthetic nature as sold under the trademark Uralite® 3140, a urethane material. The potting material 40 aids in sealing the housing interior 18, damps the vibrations imposed upon and electrically insulates the assemblies 22, but does not interfere with the flexing of the assemblies upon being subjected to sonic vibrations.

An electrical wire conductor 42 is affixed to the outer side 38 of the ceramic disc 32 of the right assembly 22. By way of example, the right diaphragm 24 and ceramic disc 32 are assembled such that the ceramic disc outer side constitutes the positive pole of the right disc 32 and the conductor 42 will be of a positive charge.

In the left assembly 22 of FIG. 1, the disc 32 is attached to the associated left diaphragm 24 such that the disc outer side 38 constitutes the negative pole of the left disc and the wire conductor 44 attached thereto will have a negative electrical characteristic.

An interior wire conductor 46 is affixed to the diaphragm inner sides 28, FIG. 1, and as the diaphragms 24 are electrically conducting, and are in an electrical conducting relationship to the associated ceramic disc 32, the inner side 28 of the right diaphragm 24 will be of a negative pole characteristic, while the left diaphragm 24, FIG. 1, inner side 28 will constitute a positive pole, and as will be appreciated from the plus and minus signs illustrated in FIG. 1, the interior conductor 46 is connected at the right end to a negative pole of the right disc 32 while the left end of the conductor 46 is electrically connected to the positive pole of the left disc 32.

Bilaminar hydrophones 10 in accord with the invention may be used singly, but are particularly suitable for use with towed arrays which may reach approximately one mile in length. A towed array consists of a plurality of segments located within a flexible support, such as a hose, and a plurality of arrays 12 are supported within such a flexible housing. The total towed array consists of a plurality of units each having a plurality of hydrophones 10 connected in a series, parallel or series-parallel electrical manner and such a plurality of hydrophones 10 are located within an elongated conductive cloth tube 48, FIG. 2. The tube 48 may be filled with a flexible conductive foam 50, and each end of the cloth tube may include a resilient foam block 52. A connector plug 54 is located exteriorly of the tube 48 and is electrically connected to the conductors of the hydrophones 10 as will be appreciated from FIG. 3.

Figure 3:
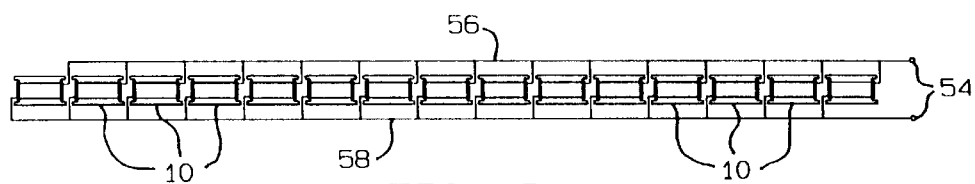
FIG. 3 is an electrical schematic view of the hydrophone array of FIG. 2.

In FIG. 3, an electrical representation of the wiring of the array 12 is shown, and it will be noted that the positive conductors 42 of the hydrophones are connected in parallel to the wire bus 56 while the negative conductors 44 are connected in parallel to the bus 58. The buses 56 and 58 are connected to the connector plug 54. The wiring connections will vary depending on the desired characteristics and may be series connections or series-parallel connections.

In use, a plurality of arrays 12 are located within a flexible support, such as a fluid filled hose or the like, not shown. The array connectors 54 interconnect so that the electrical signals produced by each hydrophone and each array can be transmitted in a preamplifier and subsequently to the signal receivers within the vessel towing the complete array. The elongated complete array may be several thousands of feet in length and the water pressure to which each hydrophone 10 is subjected may be variable and very high. However, the rigidity of the housing 14 is such as to resist crushing under water pressures within the operating range of the hydrophone 10, and likewise, the assemblies 22 are of sufficient strength as to resist damage under high hydrostatic pressure. In addition, the unique nature of the bilaminar ceramic/diaphragm sensing element is such that the acoustical sensitivity is not significantly affected by a little change in horizontal pressure.

The density, buoyancy and floatability characteristics of each hydrophone 10 are determined by the volume of the air space 18 as compared to the dry weight of the hydrophones. Accordingly, by regulating the diameter and length of each hydrophone, the "density" of the hydrophone, and the complete array, can be controlled to achieve the desired characteristics as the array is towed through the water.

Figure 6:
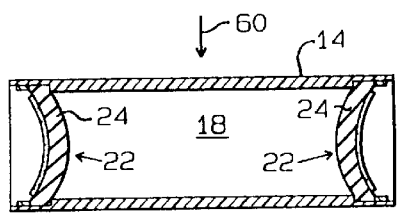
FIG. 6 is an elevational diametrical sectional view taken of the dual bilaminar hydrophone illustrating, in an exaggerated manner, the deformation occurring in the piezoelectric ceramic/diaphragm assemblies occurring during the operating mode of the hydrophone, due to being enveloped in a sound passive field, and an arrow indicating a direction from which induced motion vibrations might occur, the conductors not being shown.

Sonic vibrations, such as those created by another vessel, may approach the towed array from any direction with respect to its length and will envelope the hydrophones in a sound pressure field. Such sonic vibrations produce fluctuations in the hydrostatic pressure surrounding the hydrophones 10 and will cause a deformation of the assemblies 22 in an inward direction as shown in FIG. 6 in an exaggerated manner. Such sonic vibrations cause the components of the assemblies 22 to vibrate inwardly and outwardly, and the electric signals generated by the deformation of the ceramic discs 32 as the assemblies 22 deform are received by the electronic signal receiver, and interpreted and analyzed for the desired purpose. Sonic vibrations received by the array 12 will produce inward deformation of the assemblies 22, such that the group of hydrophones act in concert to provide the desired characteristics.

As each hydrophone 10 is connected in a series manner, FIG. 1, the deformation of the electrical signals produced by each hydrophone will be added or amplified. Such amplified signals are connected in series, parallel or series-parallel with adjacent hydrophones, FIG. 3, to permit an analyzable signal to be generated which may be used for detection and, ultimately, the direction and movement of vessels in the area, or for any other purpose with respect to the analyzing of sonic vibrations.

Figure 7:
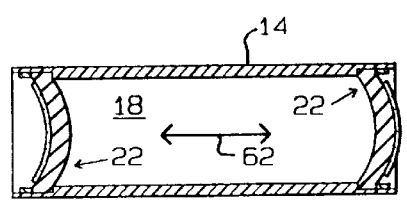
FIG. 7 is a sectional diametrical view similar to FIG. 6 illustrating the deformation of the piezoelectric ceramic/diaphragm assemblies upon receiving longitudinal motion induced noise vibrations substantially parallel to the hydrophone axis of sensitivity.

If the hydrophones 10 are displaced or accelerated in a longitudinal direction substantially along the axis of sensitivity of the hydrophone as represented by the axis of the housing 14 and arrows 62, the assemblies 22 will be deformed in a common manner, as shown in FIG. 7, rather than in an opposite manner as shown in FIG. 6. Such deformation of the assemblies 22 in a common direction produces an equal and opposite electrical signal which is cancelling in nature, and accordingly, the hydrophone 10 of the invention will not produce false readings due to longitudinal vibrations as may be imposed thereon.

Likewise, transverse movement or acceleration vibrations imposed on the housing 14 perpendicular to the axis of sensitivity as represented by arrow 60 in FIG. 6 will not cause any deflection of the assemblies 22, and no electrical signal will be generated.

A hydrophone 10 constructed in accord with the invention is economical to produce, sensitive with respect to sonic vibrations, insensitive to motion induced vibrations, low density, insensitive to hydrostatic pressure, and rugged in character.

It is appreciated that various modifications to the inventive concepts may be apparent to those skilled in the art without departing from the spirit and scope of the invention.

What is claimed is:

1. A dual bilaminar hydrophone whose buoyancy characteristics may be accurately determined comprising, in combination, a tubular cylindrical uniform wall thickness housing having a cylindrical bore, an axis and spaced ends defined along said axis, a counterbore opening defined in each of said spaced ends defining an annular shoulder concentric to said axis, a deformable diaphragm each having outer and inner surfaces and a periphery mounted in each counterbore opening engaging the associated shoulder, said diaphragms sealing the interior of said housing in an airtight manner defining a sealed air chamber within said housing, and a piezoelectric disc having positive and negative poles affixed to each diaphragm on a like surface thereof, the buoyancy characteristics of the hydrophone being determined by the volume of said air chamber as determined by the dimensions of said housing.

2. In a dual bilaminar hydrophone as in claim 1, said diaphragms each having a central axis, said diaphragm axes being coincident with each other and said housing axis defining an axis of sensitivity, the sound vibrations being sensed travelling in from any direction relative to said axis of sensitivity.

3. In a dual bilaminar hydrophone as in claim 1, a conductor connecting said positive pole of one disc with said negative pole of the other disc mounted in said housing.

4. In a dual bilaminar hydrophone as in claim 1, said diaphragms being formed of metal, and a flexible synthetic potting material engaging said piezoelectric discs and sealing said ends of said housing.

5. In a dual bilaminar hydrophone as in claim 4, said diaphragms being formed of brass.

6. In a dual bilaminar hydrophone as in claim 4, said piezoelectric discs being formed of a ceramic material.

7. A towed array of dual bilaminar hydrophones comprising, in combination, a plurality of hydrophones each comprising a housing having an axis, elongated compressible fluid filled support means supporting said hydrophones in substantially axial aligned axial spaced relationship comprising a fabric tube encasing said hydrophones and a compressible pressure conductive foam, each of said housings having open ends, a bilaminar assembly comprising a diaphragm and a piezoelectric disc affixed thereto sealing each housing open end in an airtight manner, said assemblies each having positive and negative poles, said positive and negative poles of the assemblies mounted in a common housing being electrically connected and the positive and negative poles of adjacent hydrophones being electrically connected in a parallel manner to adjacent hydrophones.

8. In a towed array as in claim 7, said positive and negative poles of a common hydrophone being electrically connected by a conductor extending through the associated housing.

\* \* \* \* \*